United States Patent [19]

Barnhouse

[11] 4,408,013

[45] Oct. 4, 1983

[54] EPIHALOHYDRIN POLYMER CURE SYSTEMS

[75] Inventor: James P. Barnhouse, North Ridgeville, Ohio

[73] Assignee: The B. F. Goodrich Company, Akron, Ohio

[21] Appl. No.: 381,117

[22] Filed: May 24, 1982

[51] Int. Cl.³ ............................................. C08L 71/02
[52] U.S. Cl. ..................................... 525/187; 525/523
[58] Field of Search ................................ 525/523, 187

[56] References Cited

U.S. PATENT DOCUMENTS 4,251,648  2/1981  Oetzel .................................. 525/187

*Primary Examiner*—Lucille M. Phynes
*Attorney, Agent, or Firm*—J. Hughes Powell, Jr.

[57] ABSTRACT

Compositions containing copolymers of epihalohydrins, an unsaturated epoxy comonomer, and optionally, ethylene oxide are readily cured to useful articles with peroxides when such compounds contain a polyacrylic acid ester of a polyol and Group IA, IIA, or IVA compound. Covulcanized compositions are prepared from mixtures of the epihalohydrin and epoxy copolymers with peroxy vulcanizable polymers.

20 Claims, No Drawings

EPIHALOHYDRIN POLYMER CURE SYSTEMS

BACKGROUND OF THE INVENTION

U.S. Pat. No. 4,251,648 discloses curing copolymers of an epihalohydrin, an unsaturated glycidyl ether, and optionally, ethylene oxide, with a peroxide, a group IA, IIA, or IVA acid acceptor compound, and optionally, certain polyfunctional unsaturated compounds. While this cure system represented an improvement over prior art systems, a less expensive system is desired.

SUMMARY OF THE INVENTION

Copolymers of epihalohydrin, an unsaturated glycidyl ether and optionally, ethylene oxide, are cured with a peroxide curing system to provide vulcanizates with an excellent balance of desirable physical properties using a polyol polyacrylate ester and a group IA, IIA, or IVA acid acceptor compound.

DETAILED DESCRIPTION

The epihalohydrin monomers useful in preparing the copolymers of this invention include epichlorohydrin, epibromohydrin, epiiodohydrin, epifluorohydrin and polymers containing two or more of these epihalohydrins. The second required comonomer is an unsaturated glycidyl ether of the general formula

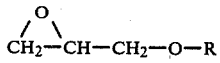

where R is an ethylenically unsaturated radical such as vinyl, allyl, alkenyl and the like. Typical glycidyl ethers include vinyl glycidyl ether, allyl glycidyl ether, butenyl glycidyl ether, 4-vinylcyclohexyl glycidyl ether, abietyl glycidyl ether, cyclohexenymethyl glycidyl ether, o-allylphenyl glycidyl ether. While the unsaturated glycidyl ethers are generally preferred, useful copolymers may also be made with monoepoxides of dienes or polyenes such as butadiene, methylene monoxide, chloroprene monoxide, 3,4-epoxy-1-pentene, 4,6-epoxy-2-hexene, 2-epoxy-5,9-cyclododecadiene, and the like. The third monomer which can be included in the polymers of this invention is ethylene oxide.

In the copolymers, the epihalohydrin will vary from 80 to 99 weight parts, and the glycidyl ether from about 1 to 20 weight parts. In the ethylene oxide copolymers the amount of epihalohydrin will be varied from about 40 to 80 weight parts of epihalohydrin, about 15 to 45 weight parts of ethylene oxide and from about 0.1 to about 20 weight parts of unsaturated glycidyl ether or monoepoxide. More preferably, the amount of unsaturated glycidyl ether will be from about 1 to 10 weight parts per 100 weight parts of comonomers.

The copolymers are readily prepared by polymerization in mass or solution, with catalysts normally found by reacting an organometallic compound, preferably an organoaluminum compound such as trialkyl aluminum with water, optionally with a small amount of a chelating agent, such as acetylacetone, ethoxyacetic acid, tetrahydrofuran, and the like. The organoaluminum compounds may include triethylaluminum, tripropyl alumunim, triisobutyl aluminum, diethyl aluminum hydride, and the like. There are many patents describing the preparation of copolymers, such as U.S. Pat. Nos. 3,158,581 and 3,219,591. These copolymers normally have a number average molecular weight of greater than about 30,000, preferably greater than 60,000, determined by Gel Permeation Chromatography.

The peroxide curative of these compositions includes any organic peroxide normally used in the curing of elastomers and polymers. Such materials include the well known benzoyl peroxide, dichlorobenzoyl peroxide, dicumyl peroxide, tertiary butyl peroxide, lauroyl peroxide, and the like; also including other diacyl peroxides as acetyl peroxide, pelargonyl peroxide, peroxyesters including tertiarybutyl peroxyacetate, tertiarybutyl peroxyisobutylrate, tertiarybutyl peroxypivalate, slkyl peroxides such as bis-tertiarybutyl peroxydiisopropyl benzene, dicumyl peroxide, hydroperoxides such as cumene hydroperoxide, acetyl cyclohexyl sulfinyl hydroperoxide, peroxydicarbonates, and the like. The amounts use preferably are greater than 0.1 weight part per 100 weight parts of copolymer, more normally, about 0.5 to 10 weight parts and preferably 1 to 3 weight parts.

The polyol polyarylate esters, acrylic acid polyesters of polyols, include such compounds as ethylene glycol-diacrylate, diethylene glycol diacrylate, tri-ethylene glycol diacrylate, tetraethylene glycol diacrylate, polyethylene glycol diacrylate, 1,6-hexanediol diacrylate, 1,3 butylene glycol diacrylate, tri-methylolpropane triacrylate, and the like. Acrylic acid esters of polyols containing 2 to 12 carbon atoms are used, normally a diol or Triol. Normally diol and triol di-and triacrylate esters of polyols containing 2 to 6 carbon atoms are employed. The amounts of these materials normally used will vary from about 0.1 to 10 weight parts per 100 weight parts of copolymer but for harder compounds, amounts of 20 or more weight parts may be used.

There are, used in conjunction with the unsaturated acrylate, compounds of Group IA, IIA, and IVA (of the Periodic Chart), for example, magnesium oxide, red lead, potassium and sodium stearate, lead carbonate, calcium oxide, barium carbonate, magnesium silicate, dibasic lead phosphite and generally compounds of Group IA, as Na and K; Group IIA, as Mg, Ca, Sr and Ba; and Group IVA, as Pb and Sn of the Periodic Chart. The compounds may be salts (particularly a fatty acid salt such as sodium, potassium, calcium stearate, oleate and the like), a chelate, a carbonate, oxide, silicate, phosphate, phthalate, salicylate, fatty acid, and many others. Such compounds include, more specifically, red lead ($Pb_2O_4$), lead oxide (litharge), magnesium oxide, stannous and stannic oxides, calcium oxide, calcium carbonate, magnesium benzoate, calcium benzoate, strontium salicylate, lead oleate, dibasic lead stearate, dibasic lead phosphite, other carboxylic acid salts such as tribasic lead meleate, dibasic lead phathalate, the carbamates, and the like.

The amounts of these compounds used are greater than about 0.1 weight part per 100 weight parts of copolymer, and more preferably, about 0.5 to about 10 weight parts. Although larger amounts may be used, they are not necessary.

The vulcanizates may include a reinforcing pigment such as any of the low, medium and high structure carbon blacks, fine calcium silicate, silica, and the like. The proportion of filler may range from as low as about 5 to about 200 parts/et. for every 100 parts/et. of total rubbery ingredients (hereinafter "PHR") in the compositions. A more preferred range for nonblack fillers is from about 20 to about 150 PHR and for carbon blacks from about 15 to about 150 PHR.

In addition to the above essential and named highly preferred ingredients, the rubber vulcanizates should otherwise be compounded in accordance with known rubber compounding principles by the inclusion of the required proportions of pigments, lubricants, plasticizers, softeners, stabilizers, antioxidants, antiozonants, tackifiers, diluents, and others to suitably prepare the stock for the particular processing, shaping, forming, and/or article building operations envisaged.

The compositions may be prepared and cured by any conventional method. For example, the compositions may be prepared by mill-mixing or by internal mixing as in Banbury mixing. Usually, the last addition of ingredients is one of the curatives and this may be effected on a cool rubber mill having water cooled rolls or in a second pass through a cool internal mixer to avoid scorching (or precuring) the composition. Once mixing is complete, the stock may be sheeted off the rubber mill ready for the final molding, extruding, calendering, etc., operations.

The resulting uncured compositions are heated, preferably under confinement or in pressurized steam, at elevated temperatures between about 250° F. to about 475° F. with from about 325° to 400° F. being more preferred. Depending both on the choice and proportions of the curatives and on the temperature in the above ranges, vulcanization is usually complete in a matter of a few minutes ranging from about 2 to about 60 minutes. Vulcanization occurs with the production of strong, elastic compositions of good dimensional and chemical stability and good resistance to low temperature in the presence of hydrocarbon fuels in a wide range of environments.

The invention will now be described more fully with reference to specific examples, which are intended as being illustrative only rather than as limiting the invention.

EXAMPLES

A masterbatch was prepared by mixing in a Banbury internal mixer 100 weight parts of a terpolymer of 57 weight percent epichlorohydrin, 39 weight percent ethylene oxide and 4 weight percent allyl glycidyl ether with 2 weight parts of potassium stearate, 1 weight part nickel dibutyldithiocarbamate, 20 weight parts of HAF furnace black, 30 weight parts of FEF furnace black and 11 weight parts of dioctyl phthalate. Portions of this masterbatch were then compounded on a mill with 2.5 weight parts of 80% calcium oxide dispersed in oil, 2.5 weight parts of 40% dicumyl peroxide on finely divided calcium carbonate, and the polyfunctional acrylates and methacrylates shown in the Table. The compounds were tested for cure rate in the Monsanto Rheometer and vulcanizates tested for stress-strain, hardness compression set, Fuel C aging and air oven aging. The amounts of the curing agents and test results obtained are set forth in the data table below. All parts are weight parts.

TABLE

| | 1 | 2 | 3 | 4 | 5 |
|---|---|---|---|---|---|
| Tetraethylene Glycol Dimethacrylate | 2.5 | | | | |
| Tetraethylene Glycol Diacrylate | | 2.5 | | | |
| 1,6-Hexanediol Diacrylate | | | 2.5 | | |
| Trimethylopropane Triacrylate | | | | 2.5 | |
| Neopentyl Glycol Diacrylate | | | | | 2.5 |
| Rheometer, 160° C. Micro Die, 100 CPM, 1° Arc, 60' Chart, 50 Range, (ASTM 2084-75) | | | | | |
| $M_H$, lbf · in | 30 | 28.5 | 31.5 | 33.0 | 31.0 |
| $M_L$, lbf · in | 7.6 | 8.0 | 8.0 | 8.0 | 8.0 |
| $T_{s2}$, min. | 1.6 | 1.5 | 1.5 | 1.2 | 1.4 |
| $T'_{90}$, min. | 14.5 | 14.5 | 12.5 | 11.5 | 14.5 |
| Original Properties - Cured 20' @ 320° F. (ASTM D-412-75) | | | | | |
| Tensile, psi | 1566 | 1516 | 1566 | 1450 | 1500 |
| % Elongation, % | 340 | 396 | 323 | 270 | 320 |
| Hardness, Shore A | 55 | 53 | 56 | 59 | 56 |
| Compression Set Plied Disc 70 hr @ 257° F. (ASTM D-395-69 Method B) | | | | | |
| % Set | 32 | 36 | 52 | 47 | 69.5 |
| FUEL C Aged 70 hr @ R.T. (ASTM D-471-75) | | | | | |
| Tensile, psi | 793 | 836 | 803 | 806 | 690 |
| % Change | −49.4 | −44.8 | −48.7 | −44.4 | −54 |
| Elongation, % | 196 | 230 | 176 | 170 | 186 |
| % Change | −42.4 | −41.9 | −45 | −37 | −41.8 |
| Hardness, Pts. | 42 | 41 | 42 | 46 | 45 |
| Points Change | −13 | −12 | −14 | −13 | −11 |
| Volume Change, % | +31.5 | +31.5 | +31.5 | +31.2 | +31.7 |
| AOA Aged 70 hr @ 150° C. (ASTM D-573-67) | | | | | |
| Ultimate Tensile, psi | 1425 | 1400 | 1450 | 1350 | 1400 |
| % Tensile Change | −9 | −7.6 | −7.4 | −6.9 | −6.6 |
| % Ultimate Elongation | 220 | 255 | 210 | 180 | 205 |
| % Elongation Change | −35.3 | −35.6 | −34.9 | −33.3 | −35.9 |
| Shore Hardness | 65 | 64 | 67 | 69 | 65 |
| Points Hardness Change | +10 | +11 | +11 | +10 | +9 |
| 80° Bend | Pass | Pass | Pass | Pass | Pass |

The time in minutes to reach an optimum state of sure as measured by the ODR is reduced as much as 20% by use of a diacrylate, trimethylol diacrylate, as compared to a dimethacrylate, tetramethylene glycol dimethacrylate. This reduction in cure time results in a decrease in molding time of molded articles and provides increased productivity in manufacturing processes. A greater Durometer hardness is also obtained with the diacrylates as compared to the dimethacrylate. Thus the diacrylates are more efficient materials and much less costly than the equivalent dimethacrylates and provide improved vulcanizates. The diacrylates also show improved retention of tensile strength and elogation than the dimethacrylate when tested for oil and solvent resistance. Further, the diacrylate esters provide improvement in heat resistance as compared to compounds containing the dimethacrylates.

Blends of copolymers of the epihalohydrin and unsaturated glycidyl ether and other elastomers are also readily cocured with peroxide-acrylate cures system of this invention. Such elastomers include unsaturated elastomers such as natural rubber and polyisoprene and the butadiene polymers including polybutadiene, butadiene-styrene copolymers, butadiene-acrylonitrile copolymers, butadiene-acrylate copolymers and other butadiene copolymers of a type known to those skilled in the art; polychloroprene; olefin polymers including polyethylene, chlorinated polyethylene, chlorosulfonated polyethylene, ethylene and propylene copolymers including ethylene and propylene or butene-1 copolymers containing unsaturation such as copolymers with dicyclopentadiene, ethylidene norborene, and the like. Polysulfide rubbers also form curable blends with these materials.

In preparing such blends they may be made on a mill, in an internal mixer, from solution, latices, dispersions, and the like. The proportions may be varied from about 5 to 95 weight percent of the epichlorohydrin copolymers of this invention with 95 to 5 weight percent of a peroxide curable polymer or elastomer. More preferably, about 10 to 75 weight percent of the epichlorohydrin unsaturated glycidyl ether or monoepoxide copolymers with 90 to 25 weight percent of a peroxide vulcanizable elastomer.

Covulcanizable blends include for example: 25 weight parts of a copolymer of 57 weight percent epichlorohydrin, 39 weight percent ethylene oxide and 4 weight percent allyl glycidyl ether with 75 weight parts of chlorinated polyethylene containing 36 weight parts chlorine; 75 weight parts of a terpolymer of 57 weight percent epichlorohydrin, 39 weight percent ethylene oxide and 4 weight percent allyl glycidyl ether and 25 weight percent of a butadiene/acrylonitrile copolymer containing 32% acrylonitrile and 80 ML Mooney; a three polymer blend of 15 weight parts of the epichlorohydrin copolymer above, 18 weight parts of a 50 ML Mooney 28% acrylonitrile/butadiene copolymer and 67 weight parts of an ethylene/propylene copolymer containing 60% ethylene; 37 percent propylene and about 3% ethylidene norbornene; 70 weight parts styrene/butadiene rubber having a Mooney of 50 ML and containing 23.5% styrene and 30 weight parts of the above epichlorohydrin copolymer, and the like.

These compositions provide cured vulcanizates, have good aging properties, compression set, resistance to solvents, in addition to a valuable balance of other desirable physical properties and find utility in aircraft, automotive and mechanical goods, packings, wiring and cable jackets, hose and belting, and the like. The low permeability, high resilience and flexibility over a wide range of temperature allows use in low temperature oil resistant and ozone resistance applications. Typical uses are in fuel pump diaphragms, oil seals, paper mill and printing rolls and molded mechanical parts.

I claim:

1. A composition comprising a polymer of an epihalohydrin and an unsaturated glycidyl ether of the general formula

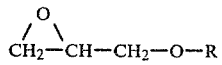

wherein R is an ethylenically unsaturated radical, an organic peroxide and acrylic acid esters of polyols containing 2 to 12 carbon atoms.

2. A composition of claim 1 wherein the polymer contains 80 to 90% epichlorohydrin and 1 to 20% allyl glycidyl ether, and said acrylic acid esters are diol and triol di- and triacrylate esters of polyols containing 2 to 6 carbon atoms.

3. A composition of claim 1 wherein the epihalohydrin in epichlorohydrin present in amounts of about 40 to 80 weight percent, there is about 15 to 45 weight percent ethylene oxide, and from about 1 to about 20 weight percent of the unsaturated glycidyl ether copolymerized together, greater than 0.1 to about 10 weight parts of organic peroxide, 0.1 to 10 weight parts each of a said acrylic acid ester and a group IA, IIA or Group IVA compound, per 100 weight parts of copolymer.

4. A composition of claim 3 wherein R of the unsaturated glycidyl ether is vinyl, allyl or alkenyl and the composition contains from 1 to 10 weight parts of a Group IA, IIA or Group IVA compound.

5. A composition of claim 4 wherein there is 1 to 10 weight parts of said acrylic acid ester selected from the group consisting of trimethylolpropane triacrylate, tetraethylene, glycol diacrylate, 1,6-hexene glycol diacrylate and neopentyl glycol diacrylate.

6. A composition of claim 4 wherein said polymer contains about 1 to 10 weight parts of allyl glycidyl ether, and about 0.5 to about 10 weight parts of magnesium oxide and about 0.5 to 10 weight parts of trimethylol propane triacrylate.

7. A composition of claim 4 wherein said polymer contains about 1 to 10 weight parts of allyl glycidyl ether, and about 0.5 to about 10 weight parts of calcium oxide and about 0.5 to 10 weight parts of trimethylol propane triacrylate.

8. A composition of claim 6 wherein the organic peroxide is an aryl hydroperoxide.

9. A composition of claim 7 wherein the organic peroxide is a aryl hydroperoxide.

10. A composition of claim 5 wherein said polymer contains about 1 to 10 weight parts of allyl glycidyl ether, and about 0.5 to about 10 weight parts of magnesium oxide or dibasic lead phosphite, about 1 to 10 weight parts of trimethylol propane triacrylate and the organic peroxide is dicumyl peroxide.

11. A composition of claim 4 wherein said polymer contains about 1 to 10 weight parts of allyl glycidyl ether, and about 0.5 to about 10 weight parts of calcium oxide and about 0.5 to 10 weight parts of trimethylol propane triacrylate.

12. A composition of claim 1 containing the epihalohydrin copolymer and a peroxy curable polymer.

13. A composition of claim 2 containing the epihalohydrin copolymer and a peroxy curable polymer.

14. A composition of claim 3 wherein said polymer is an unsaturated elastomer.

15. A composition of claim 14 wherein said unsaturated elastomer contains olefinic unsaturation.

16. A composition of claim 4 containing the epihalohydrin copolymer and a peroxy curable polymer.

17. A composition of claim 6 wherein said elastomer is a diene containing elastomer.

18. A composition of claim 17 wherein said polymer is a copolymer of butadiene.

19. A composition of claim 16 wherein said polymer is a chlorinated polyolefin.

20. A composition of claim 16 wherein said polymer is a polymer of ethylene and propylene.

* * * * *

UNITED STATES PATENT AND TRADEMARK OFFICE
CERTIFICATE OF CORRECTION

PATENT NO. : 4,408,013
DATED : October 4, 1983
INVENTOR(S) : JAMES P. BARNHOUSE

It is certified that error appears in the above-identified patent and that said Letters Patent are hereby corrected as shown below:

Claim 9, line 1"A composition of claim 7 wherein the organic 10"

Should read --A composition of claim 7 wherein the organic--

Signed and Sealed this

Fourteenth Day of January 1986

[SEAL]

Attest:

DONALD J. QUIGG

Attesting Officer     Commissioner of Patents and Trademarks